2

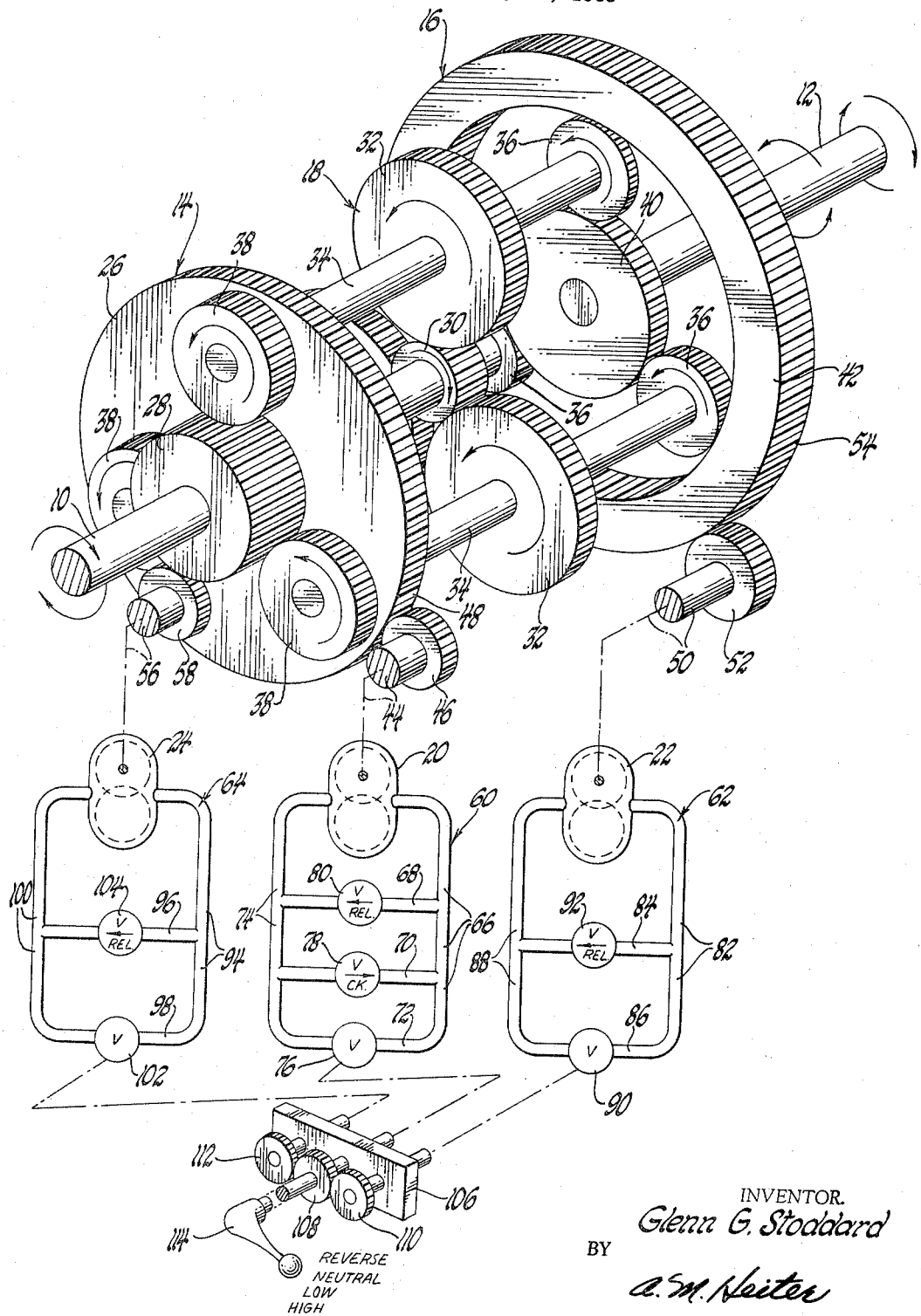

United States Patent Office 3,240,083
Patented Mar. 15, 1966

3,240,083
TRANSMISSION
Glenn G. Stoddard, South Milwaukee, Wis., assignor to General Motors Corporation, Detroit, Mich., a corporation of Delaware
Filed July 15, 1963, Ser. No. 295,129
3 Claims. (Cl. 74—758)

This invention relates to transmissions and more particularly to transmissions of the type having controlled planetary gearing arrangements providing different drive ratios.

Present day transmissions are generally complex in design, have a large number of gears, require expensive tooling to manufacture and have a life expectancy dependent in part on the frictional clutches or brakes used to control the controlled members of the planetary gearing to establish the different drive ratios. For these reasons and others, the demand for a particular transmission may be restricted both from the standpoint of cost and reliability.

An embodiment of this invention utilizes simplified planetary gearing including three combined planetary gear sets arranged to provide two forward speed drives and reverse. Each of the gear sets has a reactionary or controlled member selectively retarded by a positve displacement type hydraulic pump to provide the different drives. Each pump has its separate hydraulic control circuit and these circuits are selectively operated to effect the different drive ratios by controlling the flow of fluid issuing from the pumps. One circuit or control loop when operated by a manual control is effective to retard one of the controlled members to provide a double reduction gear train drive in low or first forward drive range and limits the output speed of the transmission in this drive range under constant load conditions and also limits the torque transmitted in this drive range. A second control loop when operated by the manual control is effective to retard another of the controlled members to provide a planetary gear drive in high or second forward drive range and limits the output speed in this drive range under constant load conditions and also limits the torque transmitted in this drive range. A third control loop when operated by the manual control is effective to retard another of the controlled members to provide a planetary gear drive in reverse and limits the output speed in this drive range under constant load conditions and also limits the torque transmitted in this drive range.

An object of this invention is to provide an improved transmission having a simplified range gearing whose different drive ranges are effected by positive displacement type pumps driven by controlled members in the range gearing responsive to controlled fluid flow downstream of the pumps to selectively retard the controlled members in the range gearing.

Another object of this invention is to provide a transmission having simplified range gearing and controlled members in the range gearing for effecting different geared drives when retarded and positive displacement type pumps driven by the controlled members whose downstream flow is controlled to retard the driving controlled members to provide the different geared drives, limit the output speed in each geared drive under constant load conditions and limit the torque transmitted in each geared drive.

Another object of this invention is to provide simplified range gearing including planetary gearing having a carrier supporting pinion shafts common to three planetary gear sets with one gear set which is disposed between the second and third gear sets having an input driven sun gear meshing with pinions fixed to the common pinion shafts, the second gear set having pinions fixed to the common pinion shafts meshing with a sun gear connected for output drive and a controlled ring gear controlled to provide a forward planetary gear drive, the common carrier being controlled to provide double reduction gear drive through the first and second gear sets, and the third gear set having pinions fixed to the common pinion shafts meshing with a controlled sun gear controlled to provide a reverse planetary gear drive.

Another object of this invention is to provide a transmission having range gearing including three planetary gear sets having a common carrier and pinion shafts with one gear set having an input driven sun gear meshing with pinions fixed to the pinion shafts, the second gear set having pinions fixed to the pinion shafts meshing with a controlled ring gear and a sun gear connected for output drive, the third gear set having pinions fixed to the pinion shafts meshing with a controlled sun gear, and positive displacement type pumps driven by the common carrier, controlled ring gear and controlled sun gear with each pump having a separate hydraulic circuit including valve means for controlling the fluid flow downstream of the pump to retard the speed of the pump and its driver.

Another object is to provide in a transmission simplified range gearing including a first planetary gear set having an input driven sun gear meshing with first pinions fixed to pinion shafts on a common carrier which is common to second and third planetary gear sets arranged on opposite sides of the first gear set, the first and second gear sets providing a double reduction gear drive with sun gear output in the second gear set when the common carrier is retarded, the second gear set including a controlled ring gear and providing planetary gear drive with sun gear output when the controlled ring gear is retarded and the third gear set having a controlled sun gear operable when retarded in conjunction with the first and second gear sets to provide another planetary gear drive with sun gear output in the second gear set.

Another object of this invention is to provide in a transmission, range gearing including three planetary gear sets arranged to provide low forward drive, high forward drive and reverse and a first positive displacement type pump driven by one controlled member of the range gearing having a hydraulic circuit including pressure responsive, check and manually controlled valves arranged in parallel effective to control fluid flow from the first pump to permit free rotation of the one controlled member in one direction and to retard the one controlled member to provide low forward drive, limit the output speed in this range under constant load conditions and limit the torque transmitted in this range, a second positive displacement type pump driven by a second controlled member having a hydraulic circuit including a pressure responsive valve and a manually controlled valve arranged in parallel effective to control fluid flow from the second pump to retard the second controlled member to provide a high forward drive, limit the output speed in this range under constant load conditions and limit the torque transmitted in this range, and a third positive displacement type pump driven by a third controlled member having a hydraulic circuit including a pressure responsive valve and manually controlled valve arranged in parallel effective to control fluid flow from the third pump to retard the third controlled member to provide reverse, limit the output speed in this range under constant load conditions and limit the torque transmitted in this range.

These and other objects will be more apparent from the following description and drawing of the preferred embodiment of the invention.

The drawing shows the preferred embodiment of the invention with portions thereof shown isometrically and other portions thereof shown diagrammatically.

Referring now to the drawing for the details of the transmission, there is shown an input member or shaft 10 and an input member or shaft 12. In a motor vehicle installation, the input shaft 10 will be joined to the engine and the output shaft 12 to the wheels in a known manner. It is understood that there is installations other than motor vehicles which require a variable speed drive and that this transmission is equally adaptable to commercial machinery and military usage. The range gearing between the shafts 10 and 12 utilizes planetary gearing including a forwardly positioned front planetary gear set 14, a rearwardly positioned rear planetary gear set 16 and an intermediate positioned intermediate planetary gear set 18 interposed between the front and rear gear sets 14 and 16. Selected controlled members in these gear sets are retarded by positive displacement type pumps 20, 22 and 24 to provide different drives and speed ratios and the assemblage and connection of the gearing and the pumps affords, as will become apparent, two forward drive ranges including low forward and high forward and a reverse drive.

Gearing

Considering first the gearing arrangement, the input shaft 10 is received through a central bore in the carrier member 26 which is common to all three gear sets and the controlled sun gear member 28 of the front gear set 14 and is freely rotatable relative to these members. Input shaft 10 is connected to drive the sun gear member 30 of the intermediate gear set 18 and planetary pinion members 32 which are fixed to rotate with pinion shafts 34 mesh with the sun gear 30. The pinion shafts 34 are freely rotatable in the carrier 26 and are connected to drive the planetary pinion members 36 of the rear planetary gear set 16 and also the planetary pinion members 38 of the front planetary gear set 14. The pinions 36 in the rear gear set 16 mesh with a sun gear member 40 which is connected to the output shaft 12 and the internal teeth of a controlled ring gear member 42. The pinions 38 in the front gear set 14 mesh with the controlled sun gear 28. Supports, bearing surfaces and a transmission housing for the above-described elements are not shown and may be provided in a conventional manner well known in the art.

The gear ratios in each drive range are optional. In the preferred embodiment sun gear 30 and planetary pinions 36 are the smallest gears and are the same size. Planetary pinions 38 are slightly larger than sun gear 30 and the controlled sun gear 28 is slightly larger than pinions 38. Planetary pinions 32 and sun gear 40 are the same size and are larger than sun gear 28.

With the input shaft 10 rotating clockwise as viewed in the drawing and no controlled members retarded, the range gearing is in neutral and the planetary pinions 36 walk in the counterclockwise direction about sun gear 40. When the carrier 26 is retarded or braked to prevent counterclockwise planeting of pinion shafts 34 the input shaft 10 drives output shaft 12 clockwise through the double reduction gear drive train provided by sun gear 30, planetary pinions 32, planetary pinions 36 and sun gear 40 and provides a low or first forward drive range. For high or second forward drive range the controlled ring gear 42 is retarded or braked and the input shaft 10 drives the output shaft 12 clockwise at an increased forward speed through the planetary gear drive provided by sun gear 30, planetary pinions 32, planetary pinions 36, ring gear 42 and sun gear 40. For reverse the controlled sun gear 28 is retarded or braked and the clockwise rotating input shaft 10 drives the output shaft 12 counterclockwise through the planetary gear drive provided by sun gear 30, planetary pinions 32, planetary pinions 38, sun gear 28, planetary pinions 36 and sun gear 40.

Controls

It is a basic principle of hydraulics that the closing or blocking of the outlet on a positive displacement type pump will in effect lock the driven impeller of the pump to the pump casing. Furthermore, by partially closing or throttling the outlet of the pump the speed of the driven impeller may be reduced rather than hydraulically locked to the pump casing. These principles are utilized to control the controlled members of the above-described range gearing. The pumps 20, 22 and 24 are related to the range gearing so that the pump 20 controls the carrier 26 to provide the low forward drive, the pump 22 controls the controlled ring gear 42 to provide the high forward drive and the pump 24 controls the controlled sun gear 28 to provide reverse. Each pump's casing is fixed to the transmission housing, not shown, with the pump 20 having its driven impeller driven by a drive shaft 44 which has fixed thereto a gear 46 meshing with external teeth 48 on carrier 26. Pump 22 has its driven impeller driven by a drive shaft 50 fixed to a gear 52 meshing with external teeth 54 on ring gear 42, and pump 24 has its driven impeller driven by a drive shaft 56 having fixed thereto a gear 58 meshing with controlled sun gear 28. Each of the pumps 20, 22, 24 has separate hydraulic circuits or control loops with pump 20 having a hydraulic circuit 60, pump 22 having a hydraulic circuit 62 and pump 24 having a hydraulic circuit 64.

As viewed in the drawing, the normal direction of rotation of the driven impellers of the pumps 20, 22 and 24 is clockwise and normal fluid flow in the hydraulic circuits is clockwise. The hydraulic circuit 60 includes a discharge passage or line 66 connected to the discharge port of the pump 20 discharging fluid to parallel branch passages or lines 68, 70 and 72 which are connected by intake passage or line 74 to the intake port of the pump 20. In branch line 72 there is provided a control valve 76 operable to partially and completely close this branch line. In branch line 70 there is provided a one-way check valve 78 permitting fluid flow only from intake line 74 to discharge line 66 and in branch line 68 there is provided a pressure responsive valve 80 which is normally held closed by a predetermined holding force and permits fluid flow therethrough from discharge line 66 to intake line 74 in response to a predetermined pressure in discharge line 66.

The hydraulic circuit 62 includes a discharge passage or line 82 connecting the discharge port of the pump 22 through parallel branch lines or passages 84 and 86 to an intake passage or line 88 which is connected to the intake port of this pump. Branch line 86 has a control valve 90 operable to partially and completely close this line and branch line 84 has a pressure responsive valve 92 similar to valve 80 preset to open this line to fluid flow to connect discharge line 82 to intake line 88 in response to a predetermined pressure in discharge line 82.

The hydraulic circuit 64 includes a discharge passage or line 94 connecting the discharge port of pump 24 by parallel branch passages or lines 96 and 98 to the intake passage or line 100 which is connected to the intake port of this pump. Branch line 98 has a control valve 102 operable to partially and completely close this line and branch line 96 has a pressure responsive valve 104 similar to valves 92 and 80 preset to permit fluid flow through this line from discharge line 94 to intake line 100 in response to a predetermined pressure in discharge line 94.

Operation

As described, the transmission offers two forward ranges of operation referred to as low and high forward range, and a reverse, as well as neutral. In neutral the valves 76, 90 and 102 are fully open and with input shaft 10 rotating clockwise the pinions 36 walk in the counterclockwise direction about sun gear 40, the pinion shafts 34 planet in the counterclockwise direction and no drive is transmitted to the output shaft 12 when loaded. Since carrier 26 supports the pinion shafts it rotates in the counterclockwise direction and thus drives the driven impeller of pump 20 clockwise to discharge fluid to the discharge line 66. Controlled ring gear 42 rotates counterclockwise and thus drives the driven impeller of pump 22 clockwise to discharge fluid to the discharge line 82 and controlled sun gear 28 also rotates counterclockwise and thus drives the driven impeller of pump 24 clockwise to discharge fluid to the discharge line 94.

To obtain the low forward drive range the valve 76 in the hydraulic circuit 60 is closed. Since the check valve 78 only permits flow from the intake line 74 to the discharge line 66 and provided that the pressure in discharge line 66 does not exceed a pressure sufficient to open pressure responsive valve 80, the discharge line of pump 20 is effectively closed or blocked thus hydraulically locking the impeller drive shaft 44 through the pump casing to the transmission housing. Since gear 46 is in mesh with the carrier 26, the latter is retarded or braked to provide the low forward drive range. When the load on output shaft 12 is constant and torque input to the input shaft 10 is increased to the point where torque input to pump 20 is sufficient to raise the pressure in discharge line 66 to a value effective to overcome the force acting to hold the valve 80 closed, this valve opens and permits bypassing of the fluid around the valve 76 to the intake line 74 and the intake port of the pump. This permits the impeller drive shaft 44 to rotate and limits the speed of the output shaft 12 in this drive range when the load is constant. In addition when the load on output shaft 12 is a variable load, the valve 80 is effective to bypass fluid whenever the torque differential between input shaft 10 and output shaft 12 exceeds a predetermined value and thus limits the torque transmitted in this drive range. Whatever load is on the output shaft 12 is eased in when the pressure in discharge line 66 is reduced to permit the valve 80 to reseat. The valve 80 also maintains the pressure in discharge line 66 at a safe pressure value below the bursting pressure value.

In high forward drive the valve 90 in the hydraulic circuit 62 and the valve 76 in the hydraulic circuit 60 are both closed. Provided that the pressure in discharge line 82 does not exceed a pressure sufficient to open pressure responsive valve 92, the discharge line of the pump 22 is effectively closed or blocked thus hydraulically locking the impeller drive shaft 50 through the pump casing to the transmission housing. Since gear 52 is in mesh with the controlled ring gear 42 the latter is retarded or braked to provide the high forward drive. In high forward drive the carrier 26 rotates clockwise and the impeller drive shaft 44 for the pump 20 rotates counterclockwise thus pumping fluid from the discharge port to the intake port which is opposite the normal direction of fluid flow. Check valve 78 bypasses the flow under this condition from intake line 74 to the discharge line 66 so that carrier 26 remains free to rotate in the clockwise direction. Since the valve 76 is closed while valve 90 is closed during high forward drive, when the transmission is downshifted from high to low only the valve 90 need be opened because the hydraulic circuit 60 will already be conditioned for low since valve 76 is closed. When the load on output shaft 12 is constant and torque input to input shaft 10 is increased to the point where torque input to pump 22 is sufficient to raise the pressure in discharge line 82 to a value effective to overcome the force acting to hold valve 92 closed, this valve opens and bypasses fluid to the intake line 88. This permits the controlled ring gear 42 to rotate and limits the speed of output shaft 12 in this range when the load is constant. When the load on output shaft 12 is a variable load, the valve 92 is effective to bypass fluid whenever the torque differential between shafts 10 and 12 exceeds a predetermined value and thus limits the torque transmitted in this drive range. Whatever load is on the output shaft 12 is eased in when the pressure in discharge line is reduced to permit the valve 92 to reseat. The valve 92 also limits the maximum pressure in discharge line 82 to a safe value.

For reverse valves 76 and 90 are open and valve 102 in hydraulic circuit 64 is closed. In the event that the pressure in discharge line 94 is not effective to overcome the holding force acting on valve 104, the shaft 56 acting through gear 58 retards or brakes sun gear 28 to provide reverse. When the load on output shaft 12 is constant and the torque input to input shaft 10 is increased to the point where the pressure developed in discharge line 94 as a result of increased input pump torque is effective to overcome the holding force acting on valve 104, this valve opens to bypass fluid to the intake line 100. This permits the controlled sun gear 28 to rotate and limit the speed in this range when the load is constant. When the load on output shaft 12 is a variable load, the valve 104 is effective to bypass fluid whenever the torque differential between shafts 10 and 12 exceeds a predetermined value and thus limits the torque transmitted in this drive range. Whatever load is on the output shaft 12 is eased in when the pressure in discharge line is reduced to permit valve 104 to reseat. Valve 104 also limits the pressure in discharge line 94 to a safe value.

The control valves 76, 90 and 102 may also be selectively partially closed rather than fully closed in each drive range to throttle or restrict the fluid flow to reduce the speed of the driven impellers. Thus the speed ratio between input shaft 10 and output shaft 12 in each drive range may be selectively varied.

To provide for ease of control and also cooling of the fluid in the different hydraulic circuits, there is provided a valve and manifold block 106 to contain the valves 76, 90 and 102. The valve and manifold block 106 is adapted to be mounted adjacent to the transmission housing and provides proper heat dissipation in the hydraulic circuits and may include means for passing a coolant therethrough. The valves 76, 90 and 102 disposed in the valve and manifold block 106 are opened and closed by selective rotation of gears 108, 110 and 112 respectively and these gears are ganged so that gear 108 meshes with gears 110 and 112. A control handle 114 is fixed to rotate gear 108 and through gear 108 the gears 110 and 112. The control handle 114 is operable upon rotation to the positions designated as reverse, neutral, low and high to operate the valves 76, 90 and 102 and condition the transmission for the aforementioned respective drive ranges. In the neutral position of the control handle 114, valves 76, 90 and 102 are open and upon rotation to the low position, only the valve 76 is closed and upon further rotation to the high position, the valve 76 remains closed and in addition the valve 90 is closed. Upon rotation of the control handle to reverse only the valve 102 is closed.

The above-described preferred embodiment is illustrative of the invention which it will be appreciated may be modified within the scope of the appended claims.

I claim:

1. In a transmission control for a transmission having range gearing including a first rotatable controlled member operable when retarded to provide one drive range, a second rotatable controlled member operable when retarded to provide a second drive range and a third rotatable controlled member operable when retarded to provide a third drive range, (a) a first positive displacement type pump having first intake and discharge passages adapted to be driven by said first controlled member, (b) first valve means operable in a first condition to connect said first discharge passage to said first intake passage to selectively provide free and restricted fluid flow from said first discharge passage to said first intake passage and in a second condition to close said first discharge passage, (c) first pressure responsive valve means operable in response to a predetermined pressure in said first discharge passage when said first discharge passage is closed by said first valve means to bypass said first valve means and connect said first discharge passage directly to said first intake passage, (d) check valve means operable to permit fluid flow from said first intake passage to said first discharge passage, (e) a second positive displacement type pump having second intake and discharge passages adapted to be driven by said second controlled member, (f) second valve means operable in a first condition to connect said second discharge passage to said second intake passage to selectively provide free and restricted fluid flow from said second discharge passage to said second intake passage and in a second condition to close said second discharge passage, (g) second pressure responsive valve means operable in response to a predetermined pressure in said second discharge passage when said second discharge passage is closed by said second valve means to bypass said second valve means and connect said second discharge passage directly to said second intake passage, (h) a third positive displacement type pump having third intake and discharge passages adapted to be driven by said third controlled member, (i) third valve means operable in a first condition to connect said third discharge passage to said third intake passage to selectively provide free and restricted fluid flow from said third discharge passage to said third intake passage and in a second condition to close said third discharge passage, (j) and third pressure responsive valve means operable in response to a predetermined pressure in said third discharge passage when said third discharge passage is closed by said third valve means to bypass said third valve means and connect said third discharge passage directly to said third intake passage.

2. In a transmission control for a transmission having range gearing including a first rotatable controlled member operable when retarded to provide a low forward drive range for transmitting torque to a load, a second rotatable controlled member operable when retarded to provide a high forward drive range for transmitting torque to a load and a third rotatable controlled member operable when retarded to provide a reverse drive range for transmitting torque to a load, (a) a first positive displacement type pump having first intake and discharge passages adapted to be driven by said first controlled member, (b) first valve means operable in a first condition to connect said first discharge passage to said first intake passage to selectively provide free and restricted fluid flow from said first discharge passage to said first intake passage and in a second condition to close said first discharge passage whereby in said first condition said first controlled member is selectively rendered free to rotate in one direction and retarded and in said second condition said first controlled member is effectively prevented from rotation in said one direction, (c) first pressure responsive valve means operable in response to a predetermined pressure in said first discharge passage when said first discharge passage is closed by said first valve means to connect said first discharge passage to said first intake passage whereby said first controlled member is permitted to rotate in said one direction to limit the output speed in said low forward drive range when the load is constant in said low forward drive range and to limit the torque transmitted in said low forward drive range, (d) check valve means operable to permit fluid flow from said first intake passage to said first discharge passage whereby said first controlled member is rendered free to rotate in the opposite direction when said first discharge passage is closed by said first valve means, (e) a second positive displacement type pump having second intake and discharge passages adapted to be driven by said second controlled member, (f) second valve means operable in a first condition to connect said second discharge passage to said second intake passage to selectively provide free and restricted fluid flow from said second discharge passage to said second intake passage and in a second condition to close said second discharge passage whereby in said first condition said second controlled member is selectively rendered free to rotate in one direction and retarded and in said second condition said second controlled member is effectively prevented from rotation in said one direction, (g) second pressure responsive valve means operable in response to a predetermined pressure in said second discharge passage when said second discharge passage is closed by said second valve means to connect said second discharge passage to said second intake passage whereby said second controlled member is permitted to rotate in said one direction to limit the output speed in said high forward drive range when the load is constant in said high forward drive range and to limit the torque transmitted in said high forward drive range, (h) a third positive displacement type pump having third intake and discharge passages adapted to be driven by said third controlled member, (i) third valve means operable in a first condition to connect said third discharge passage to said third intake passage to selectively provide free and restricted fluid flow from said third discharge passage to said third intake passage and in a second condition to close said third discharge passage whereby in said first condition said third controlled member is selectively rendered free to rotate in one direction and retarded and in said second condition said third controlled member is effectively prevented from rotation in said one direction, (j) and third pressure responsive valve means operable in response to a predetermined pressure in said third discharge passage when said third discharge passage is closed by said third valve means to connect said third discharge passage to said third intake passage whereby said third controlled member is permitted to rotate in said one direction to limit the output speed in said reverse drive range when the load is constant in said reverse drive range and to limit the torque transmitted in said reverse drive range.

3. The invention defined in claim 2 and control means operatively connected to said first, second and third valve means operable in a first condition to operate said first valve means to close said first discharge passage, in a second condition to operate said first and second valve means to close said first and second discharge passages, and in a third condition to operate said third valve means to close said third discharge passage.

References Cited by the Examiner
UNITED STATES PATENTS 2,604,799 7/1952 Hinton _____ 74—782 X
2,772,583 12/1956 Harbaugh _____ 74—758
2,890,604 6/1959 Campbell _____ 74—764 X

FOREIGN PATENTS 522,058 2/1954 Belgium.

DON A. WAITE, *Primary Examiner.*